United States Patent
De Witt

[11] 3,741,681
[45] June 26, 1973

[54] HOLLOW TURBINE ROTOR ASSEMBLY

[75] Inventor: Stewart H. De Witt, Media, Pa.

[73] Assignee: Westinghouse Electric Corporation, Pittsburgh, Pa.

[22] Filed: May 28, 1971

[21] Appl. No.: 147,805

[52] U.S. Cl............ 416/95, 416/193, 416/220, 416/212, 416/225
[51] Int. Cl............................................. F01d 5/18
[58] Field of Search................ 416/219, 220, 204, 416/500, 230; 46/90, 92, 212, 95–97, 193, 225

[56] References Cited
UNITED STATES PATENTS

| | | | |
|---|---|---|---|
| 779,911 | 1/1905 | Curtis | 416/191 |
| 2,774,566 | 12/1956 | Richardson | 416/225 |
| 2,967,043 | 1/1961 | Dennis | 416/221 |
| 3,446,481 | 5/1969 | Kydd | 416/95 X |
| 3,471,127 | 10/1969 | Emmerson | 416/95 |

FOREIGN PATENTS OR APPLICATIONS

| | | | |
|---|---|---|---|
| 1,341,910 | 9/1963 | France | 416/220 |
| 926,084 | 4/1963 | Great Britain | 416/220 |

Primary Examiner—Everette A. Powell, Jr.
Attorney—A. T. Stratton, F. P. Lyle and F. Cristiano, Jr.

[57] ABSTRACT

Rotor assembly for axial flow turbines and the like characterized in that the rotor blades are supported from both the root and the tip of the blade. The blades are held in place by bolts which extend through the blades and are connected at their inner ends to a rotor disc and at their outer ends to the blade tips or to a band surrounding an outer shroud for the blade tips.

6 Claims, 8 Drawing Figures

HOLLOW TURBINE ROTOR ASSEMBLY

BACKGROUND OF THE INVENTION

As is known, turbine blades of the side-entry type are provided with a root portion, usually of fir-tree shape, i.e., in the form of an elongated triangular block provided with adjacent transverse grooves in its sides which fit into corresponding grooves in the walls of a triangular slot in the periphery of a rotor disc. The blades are thus supported only at their radially innermost end, a condition which sometimes gives rise to vibration and other problems.

By increasing turbine inlet temperatures, higher thrust-to-weight and thrust-to-volume ratios can be obtained. Increased operating temperatures, however, require that the turbine blades be air cooled. Because of the various aerodynamic, heat transfer, stress and mechanical design criteria which the rotor blade must satisfy, the design of the internal blade geometry for cooling is somewhat restricted. Most successful designs heretofore proposed have incorporated circuitous passages in the blade casting through which cooling air passes, exhausting at the tip. Casting blades of this type is a difficult and expensive process, and problems are encountered in attempting to convey the cooling air up through the blade root and into the passages within the blade itself.

SUMMARY OF THE INVENTION

In accordance with the present invention, a turbine rotor blade design is provided wherein the blades themselves preferably though not essentially, comprise hollow thin-walled airfoil sections that are supported from both the root and tip portions of the blade. Elongated bolt members or support rods pass through the hollow blades and are secured at their radial inner ends to a rotor disc and at their radial outer ends to the blade tips. Integrally formed with the airfoil sections near the root portions thereof are blade platforms spanning the space between adjacent blades. These platforms are spaced from the periphery of the rotor disc by leg portions which are intermediate adjacent blades and which preferably carry at their radial inner ends triangularly-shaped roots which fit into cooperating slots in the rotor disc. These leg portions, spacing the blade platforms from the rotor disc-periphery, provide spaces beneath the hollow blades into which cooling air can be forced and then conducted out through the blades themselves. In the usual case, the support rods are loose or unloaded in the cold, zero speed condition of the turbine and become loaded by thermal growth of the vane sections and centrifugal loading on the blades. In certain embodiments of the invention, an outer shroud is formed at the blade tips and the support rods secured to a band encircling the outer shroud.

The invention results in an inexpensive and light weight turbine rotor construction which results in higher allowable operating gas temperatures because of the lower stress level in the thin-walled airfoils. At the same time, blade vibration and blade locking problems are reduced and closer radial clearances are possible because the blades are cooled. Finally, the construction is better able to withstand thermal shocks since all parts exposed to the hot gases are thin-walled with nearly uniform thickness.

The above and other objects and features of the invention will become apparent from the following detailed description taken in connection with the accompanying drawings which form a part of this specification, and in which.

Figure 1:
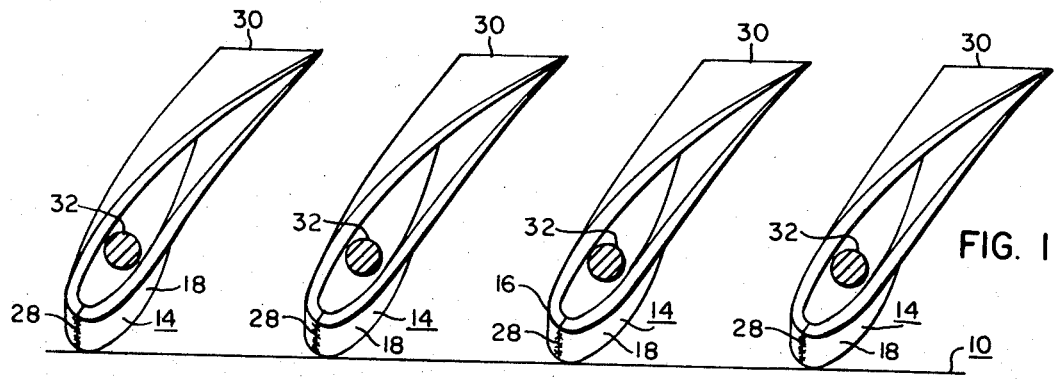
FIG. 1 is a top view of a plurality of circumferentially spaced rotor blades constructed in accordance with the teachings of the invention.
Figure 2:
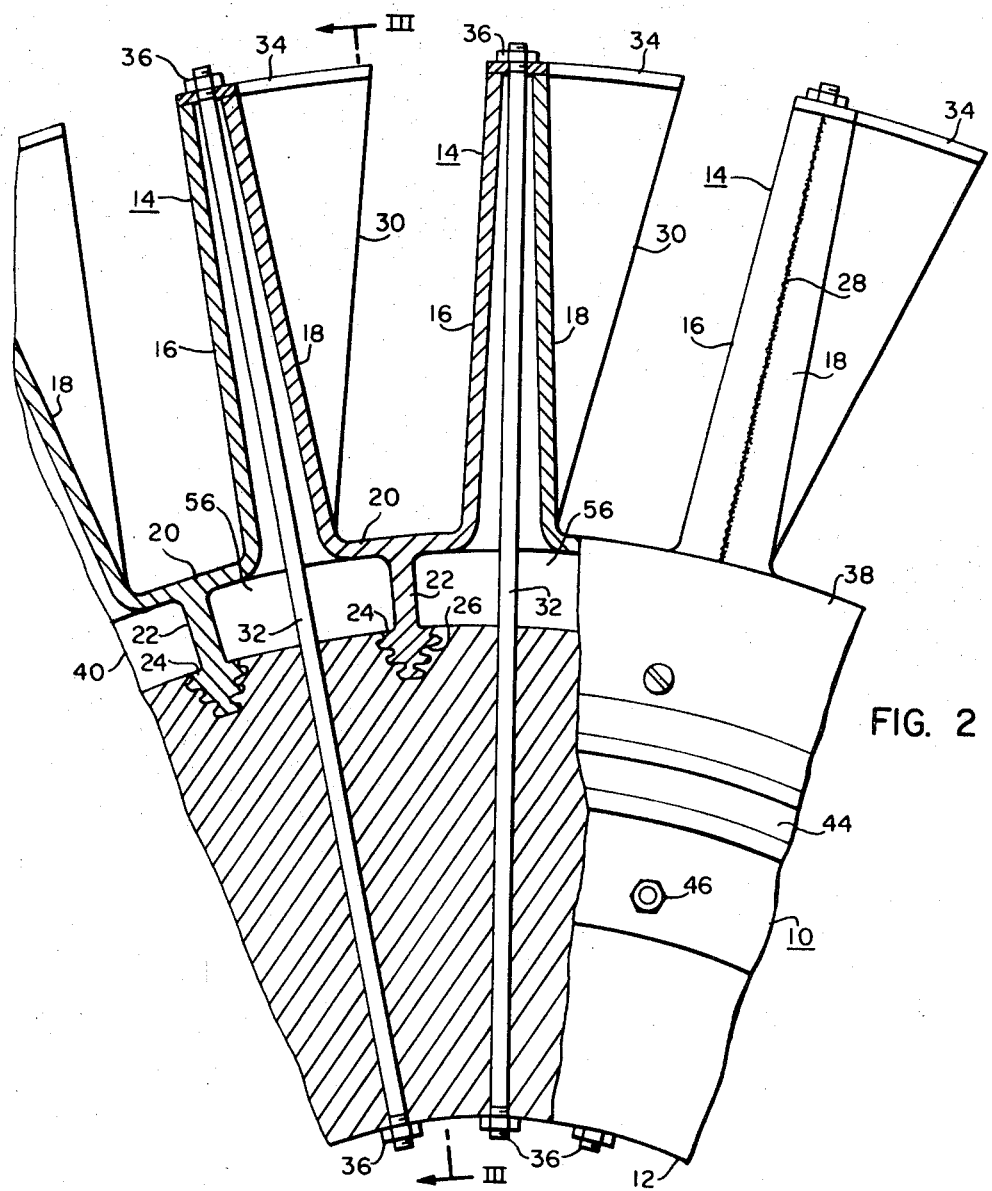
FIG. 2 is a side elevational view, partly in section, of the rotor assembly of the invention showing the manner in which support rods secure the rotor blades in place.
Figure 3:
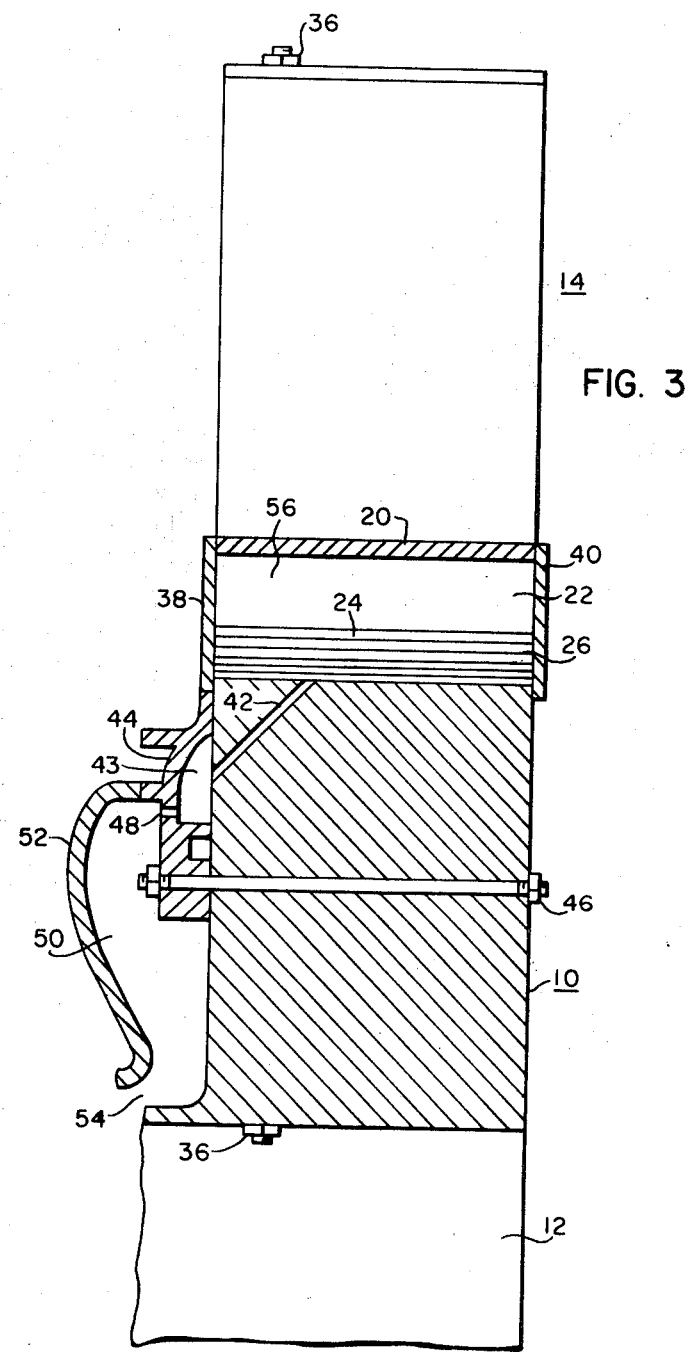
FIG. 3 is a radial sectional view taken substantially along line III—III of FIG. 2.

With reference now to the drawings, and particularly to FIGS. 1, 2 and 3, there is shown a rotor disc 10 having a large central circular opening 12 therein. The disc 10, while not shown in detail, may comprise part of a complete turbine rotor assembly in which there may be a plurality of turbine discs interlocked with reach other by toothed curvic-clutch flanges of annular shape and bolted together into one complete assembly. The opposite ends of the assembly, in turn, are connected to the main turbine shaft.

The rotor disc 10 carries on its periphery a plurality of circumferentially spaced turbine blades 14, as is conventional. The turbine blades 14 of the present invention comprise hollow airfoil sections of essentially constant wall thickness. In the embodiment of the invention shown in FIGS. 1–3, the blades 14 are of airfoil shape and formed from individual cast sections welded together. Each of these cast sections has a cross section, as viewed in FIG. 2, in the form of a tuning fork and includes the low pressure or convex side 16 of one blade 14, the high pressure or concave side 18 of the next successive turbine blade, and a pedestal portion 20 interconnecting the bottoms of the two sides 16 and 18. Depending downwardly from the pedestal portion 20, and integral therewith, is a leg or spacer 22 which carries at its bottom an integral triangularly-shaped root 24. The root 24 is provided, as is conventional, with grooves 26 in two of its sides which fit into cooperating grooves in a slot formed in the periphery of the rotor disc 10. As shown in FIG. 2, for example, there is a plurality of such slots circumferentially spaced around the periphery of the disc 10.

The low pressure side 16 of one turning fork configuration is attached to the high pressure side 18 of the next successive tuning fork configuration by welding. For example, the welding may be provided along seam 28 at the leading edge of each blade, and similarly, along the trailing edge 30 (FIG. 1).

However, if desired, the sides 16 and 18 of the blades may be connected to each other in any other suitable manner. Hollow blades are often provided with narrow elongated slits at the leading and trailing edges for emission of coolant fluid from the blade into the motive gas stream. Accordingly, the sides 16 and 18 may be connected to each other by intermittent weld points (instead of a continuous weld seam) to permit coolant fluid flow through the unwelded slit portions (not shown). Also, if desired, the geometry of the slits could be varied by simply changing the surfaces of the mating parts 16 and 18.

The tuning fork configurations, when all welded together in the manner described above, comprise a complete 360° arrangement of spaced turbine blades. Extending through the hollow turbine blades and through bores in the turbine disc 10 are elongated support rods or bolts 32 which are secured at their inner ends to the periphery of the enlarged opening 12 and at their outer ends to cover plates 34 for the hollow blades 14. While nuts 36 are shown threaded onto the opposite ends of the rods 32 in the embodiment of FIGS. 1–3, it will be understood that the upper end of the rod can be formed integrally with the cover plate 34 and that devices other than nuts can be used on the inner ends of the rods.

Cover plates 38 and 40 (FIGS. 2 and 3) are provided on opposite sides of the space between the platform portions 20 and the periphery of the disc 10 to provide a plurality of circumferentially spaced chambers 56 which communicate with the interiors of the hollow blades 14 as well as with passageways 42 (FIG. 3) which lead to an annular chamber 43 formed by casting 44 secured to the side of the turbine disc 10 by means of bolts 46. The annular chamber 43 formed by casting 44 is connected through openings 48 to a second annular chamber 50 formed by casting 52. Cooling air enters the chamber 50 through passageway 54 and thence flows through the openings 48 and passageways 42 into the chambers 56 formed between the platform portions 20 and the periphery of disc 10. From the chambers, it can flow outwardly through the hollow blades 14 and through openings in the tips of the blades, not shown.

With an arrangement such as that shown in FIGS. 1–3, the support rods 32 will normally be loose or "unloaded" in the cold, zero speed condition of the turbine and will become loaded by thermal growth of the turbine blades 14 and by centrifugal loading that bends the blade inner shroud formed by the platform portions 20. This results in "unloading" the roots 24, meaning that the roots can be substantially smaller than they would otherwise be. By varying the initial setting of the support rods and the stiffness of the portions 20, a balance of root and rod support can be obtained with resultant low stress levels in the airfoil at the design operating temperature and speed. The design readily facilitates air cooling of the blades without requiring the casting of intricate internal passageways which create different wall thickness and varying thermal stresses within the blades.

Figure 4:
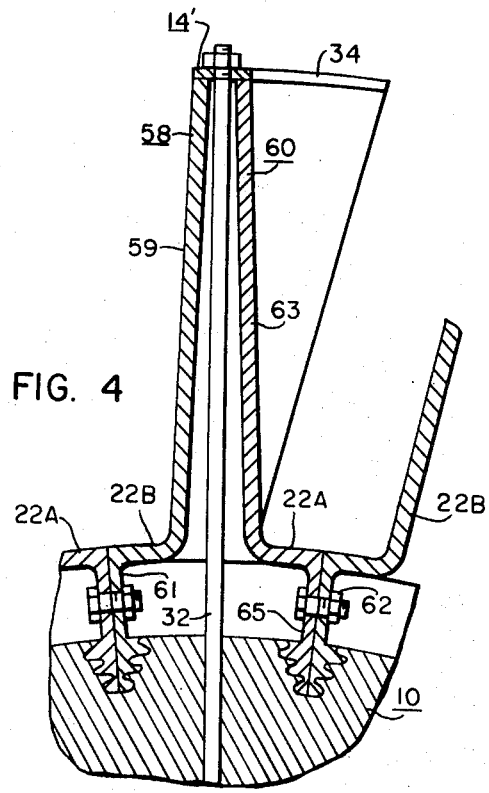
FIG. 4 is an illustration of an alternative embodiment of the invention wherein each turbine blade is formed from two parts each comprising one-half blade and one-half root.

In FIG. 4, another embodiment of the invention is shown which is similar to that of FIGS. 1–3, except that in this case one-half of each blade is formed from a section 58 comprising the low pressure side 59 of one turbine blade 14 and one-half of a root section. The other half of each blade 14 is formed from a section 60 comprising the low pressure side 63 and one-half of a root section 65. The spacers or platforms are now formed in the two parts 22A and 22B and may be bolted together as by means of bolts 62. Again, each blade is welded along seams at its leading and trailing edges. Aside from this, the construction and operation of the embodiment shown in FIG. 4 is the same as that shown in FIGS. 1–3.

Figure 5:
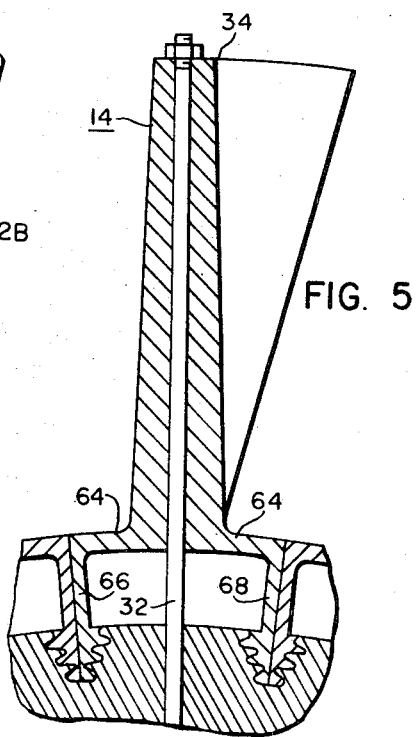
FIG. 5 is an illustration of still another embodiment of the invention wherein the blades are essentially solid in cross section and are provided on opposite sides with blade platforms and one-half of a root construction.
Figure 6:
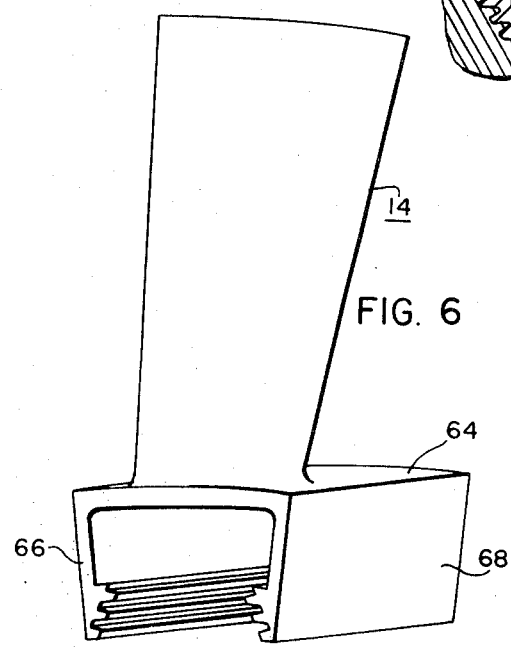
FIG. 6 is a perspective view of the embodiment of the invention shown in FIG. 5.

In FIGS. 5 and 6, still another embodiment of the invention is shown wherein the blades 14 are solid castings provided with integral platform portions 64 having downwardly depending portions 66 and 68 which form one-half of a root section. The blades of FIG. 6, when assembled around the periphery of the rotor disc 10, assume the configuration shown in FIG. 5. Openings can be drilled or cast into the solid blades to facilitate air cooling.

Figure 7:
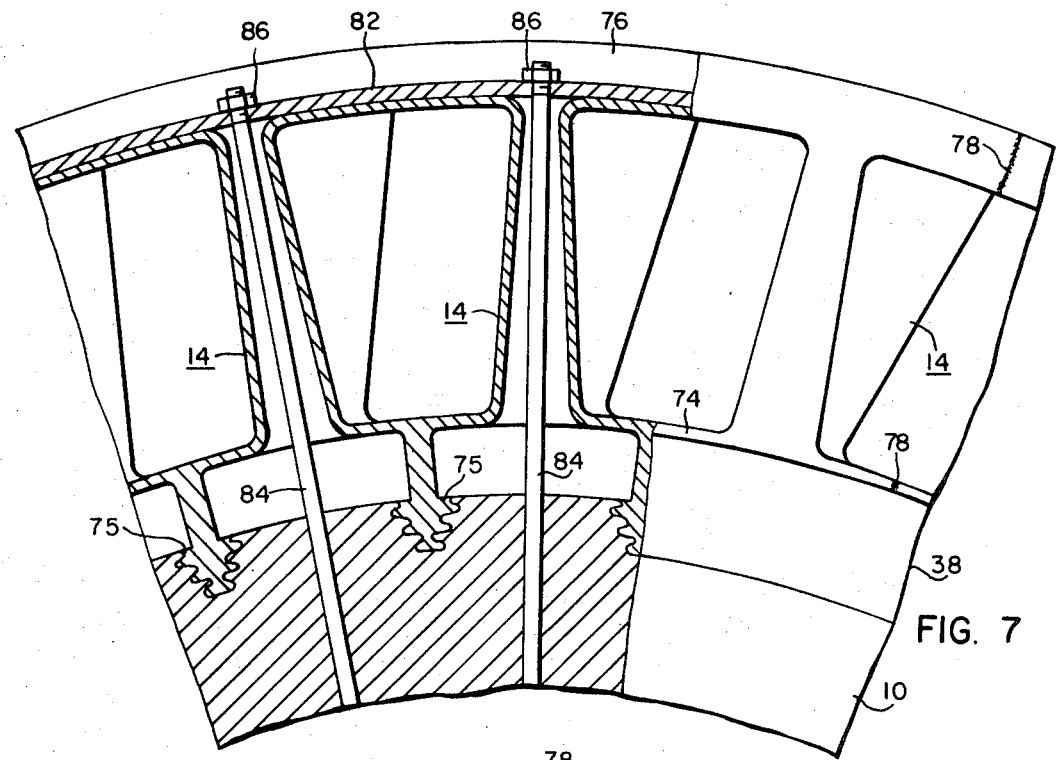
FIG. 7 is a side elevational view, partly in section, of an embodiment of the invention utilizing shrouded turbine blades.
Figure 8:
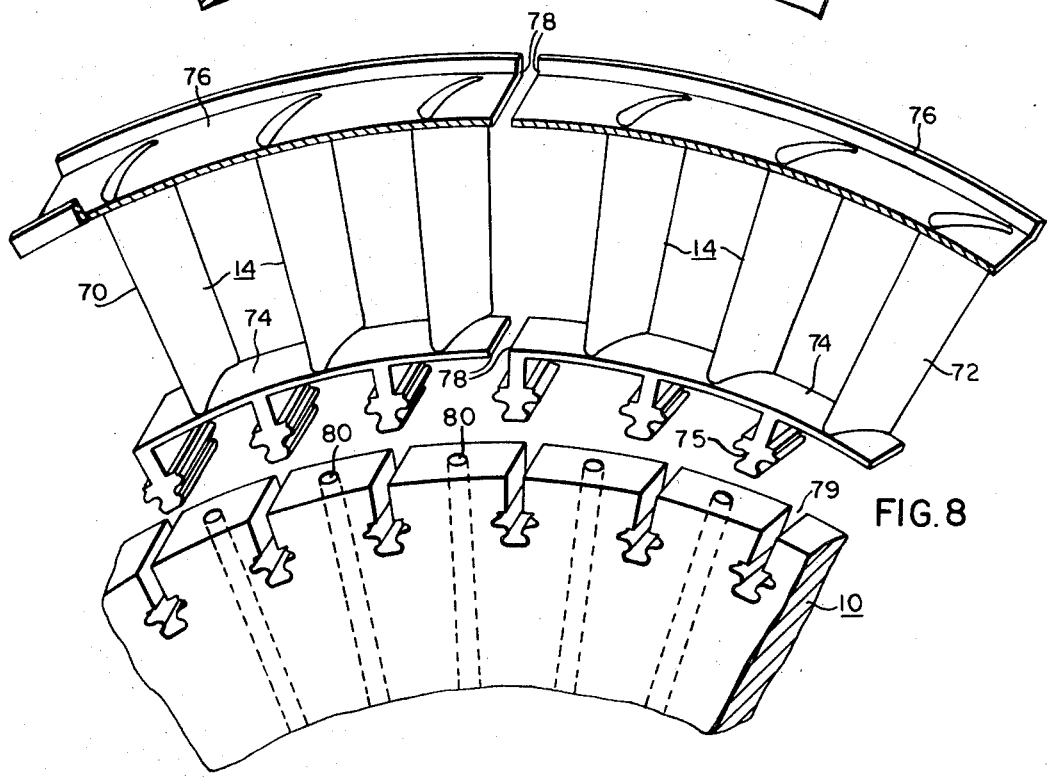
FIG. 8 is a perspective view illustrating the shrouded blade construction of FIG. 7.

With reference now to FIGS. 7 and 8, a shrouded blade configuration is shown. The blades may be formed as in the previous embodiment in which they are welded along their leading and trailing edges; or, as shown in FIG. 8, they can be cast in integral groups 70 and 72, for example, having inner shroud portions 74 and outer channel-shaped shroud portions 76 welded together along edges 78. Again, the inner shrouds 74 are provided with roots 75 which fit into cooperating slots 79 in the rotor disc 10. Elongated support rods, not shown in FIG. 8, pass through the hollow blades 14 and through openings or bores 80 in the disc 10 to fasten the blade assemblies to the disc. In this case, and as perhaps best shown in FIG. 7, an annular band 82 fits into the outer channel-shaped shroud 76 an is provided with openings through which the support rods 84 of FIG. 7 pass and are secured in place by means of nuts 86.

In all of the embodiments disclosed and described, the elongated support rods become loaded in tension during operation, thereby relieving the root portions of the blades of a part of the tensile stress that they would otherwise have to assume. It will be noted that as the support rods assume a portion of the load by tensile stress, an opposing compressive stress is imposed on the blades and roots, and this compressive stress relieves the tensile stress on the blade and root that is induced by the centrifugal forces and the motive gases acting on the blades.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a turbine rotor having a rotor disc assembly, a plurality of radially extending blade elements disposed about the periphery of said disc assembly, each of said blade elements comprising a pedestal portion having a convex blade section at one side thereof and a concave blade section at the other side, each pedestal portion having a root portion engaging the disc assembly to attach the blade element thereto, the blade elements being disposed circumferentially around the disc assembly so that the blade sections of adjacent blade elements abut each other, said abutting blade sections being joined together to form radially extending, hollow turbine blades, means for supplying coolant fluid to flow through said hollow blades, and an elongated support rod extending radially through each of said blades the support rods being attached to the disc assembly and being connected to support the radially outer ends of the hollow blades.

2. The combination of claim 1 in which said support rods are essentially unloaded in the cold, zero speed condition of the turbine and are loaded to a predetermined stress under normal operating conditions of temperature and speed.

3. The combination of claim 2 in which said coolant fluid is directed into the spaces under the pedestal portions and between adjacent root portions and flows from said spaces into the hollow blades.

4. The combination of claim 2 in which each blade element is an integral member having a grooved root portion engaging corresponding grooves in the disc assembly, and the radially outer ends of the support rods being attached to cover plates engaging the radially outer ends of the hollow blades.

5. The combination of claim 2 in which each blade element is divided into two parts each consisting of one blade section, one-half the pedestal portion and one-half the root portion, the two parts abutting and the two half root portions being secured together, the root portions having grooves engaging corresponding grooves in the disc assembly, and the radially outer ends of the support rods being attached to cover plates engaging the radially outer ends of the hollow blades.

6. The combination of claim 2 and including a shroud member encircling the outer ends of the hollow blades, and means for connecting the outer ends of the support rods to said shroud member.

* * * * *